United States Patent [19]

Natsuume

[11] 4,015,993

[45] Apr. 5, 1977

[54] HYDRAULIC COMPOSITION WITH ADDITIVE

[75] Inventor: Tadao Natsuume, Yokosuka, Japan

[73] Assignee: Nippon Zeon Co., Ltd., Tokyo, Japan

[22] Filed: Feb. 12, 1975

[21] Appl. No.: 549,486

[30] Foreign Application Priority Data

Feb. 19, 1974 Japan .............................. 49-19730

[52] U.S. Cl. ................................. 106/90; 106/107; 106/104; 106/111; 106/119; 106/117; 106/120; 106/314; 106/315

[51] Int. Cl.$^2$ ...................... C04B 7/02; C04B 7/35

[58] Field of Search ............. 106/315, 90, 95, 107, 106/314, 111, 117, 104, 119, 120

[56] References Cited

UNITED STATES PATENTS

| | | | |
|---|---|---|---|
| 2,478,831 | 8/1949 | MacPherson | 106/90 |
| 2,880,102 | 3/1959 | Woodard | 106/90 |
| 3,598,621 | 8/1971 | Ferrara | 106/315 |
| 3,817,767 | 6/1974 | Bozer | 106/90 |
| R23,873 | 9/1954 | Ludwig | 106/315 |

*Primary Examiner*—Patrick P. Garvin
*Assistant Examiner*—John F. Niebling
*Attorney, Agent, or Firm*—Sherman & Shalloway

[57] ABSTRACT

A hydraulic composition comprising 100 parts by weight of a hydraulic substance and 0.01–2 parts by weight of a cyclopentane derivative selected from cyclopentanetetracarboxylic acid and alkali metal, alkaline earth metal and ammonium salts of cyclopentanetetracarboxylic acid.

9 Claims, No Drawings

HYDRAULIC COMPOSITION WITH ADDITIVE

This invention relates to a hydraulic composition which not only can provide mortar or concrete of good workability by the addition of a relatively small amount of water but also can develop high strength after the mortar or concrete has been cured.

Conventional hydraulic compositions of this kind obtained by mixing hydraulic substances with additives such as lignosulfonic acid and its salts, alkylarylsulfonic acids and their salts, water-soluble salts of naphthalenesulfonic acid-formaldehyde condensate, hydroxycarboxylic acids and their salts etc. have gained widespread use in many fields. However, these additives were not entirely satisfactory in that the desired effects were not obtained by the use of these additives in small amounts and that, on the other hand, their use in excess resulted in the entrainment of an excessive amount of air in the mortar or concrete, the retardation of its hardening, or an undesirable decline in the strength of the hardened product.

The object of the present invention is to provide an improved hydraulic composition as a resulting of discovering a new additive that is free from the aforementioned shortcomings. It has now been found that the foregoing object can be achieved by using as the additive a cyclopentane derivative selected from cyclopentanetetracarboxylic acid and alkali metal, alkaline earth metal and ammonium salts of the cyclopentanetetracarboxylic acid. The cyclopentanetetracarboxylic acid will sometimes be abbreviated as CPTA hereinbelow.

Accordingly, there is provided in accordance with the present invention a novel hydraulic composition comprising a hydraulic substance incorporated with the above additive.

The term "hydraulic substance", as used herein, denotes in accordance with the usual definition a substance which has the property of hardening when mixed with water as a result of undergoing a hydration reaction. Typical examples of hydraulic substances include portland cement, alumina cement, blast furnace slag and mixtures of quicklime and siliceous sand. On the other hand, examples of the salts of CPTA are the salts of alkali metals such as sodium and potassium, the salts of alkaline earth metals such as magnesium and calcium, and the ammonium salt of CPTA. Preferred salts of CPTA are the alkali metal salts, of which sodium salts of CPTA such as tri- or tetra- sodium salt of CPTA are especially preferred.

CPTA can, for example, be obtained at a relatively low cost by oxidizing a Diels-Alder adduct of cyclopentadiene and maleic anhydride. The salt of the CPTA can be easily obtained, for example, by a neutralization reaction between CPTA and an alkali compound. The method per se for preparing these CPTA derivative, however, is not within the scope of this invention.

These cyclopentane derivatives are effective even when used in smaller amounts than in the case of the conventional additives. Moreover, even when these cyclopentane derivatives are used in relatively large amounts, there is no manifestation of any objectionable side effects such as a decline in strength but, instead, they possess the excellent property of enhancing the effects. Hence, no particular restrictions are imposed on the proportion in which these cyclopentane derivatives are admixed with the hydraulic substance in this invention. However, for usual purposes, the cyclopentane derivatives are suitably used in an amount of the cyclopentane derivatives are suitably used in an amount of 0.01–2.0 parts by weight, and especially 0.01–1.0 part by weight, per 100 parts by weight of the hydraulic substance.

The hydraulic composition of this invention consisting of the hydraulic substance admixed incorporated with the aforesaid cyclopentane derivatives excels in its workability not only when it is mixed with water but also when the resulting mortar or concrete is used. In addition, great strength can be imparted to the hardened mortar or concrete. It is not known by what mechanism these effects are brought about in the hydraulic composition of this invention. However, we presume that the dispersibility of the particles of the hydraulic substance in water increases as a result of an interaction between $Ca^{++}$ or $O^{--}$ on the particle surface of the hydraulic substance and the cyclopentane derivative, and this promotes the hydration reaction.

Needless to say, the hydraulic composition of the invention can contain other known additives such as curing accelerators, retarders, waterproofing agents, or shrinkage reducing agents in conjunction with the foregoing cyclopentane derivatives.

The following Example is given for specifically illustrating the invention.

EXAMPLE 1,2,3,4-Cyclopentanetetracarboxylic acid (melting point 186° C) obtained by oxidizing a Diels-Alder adduct of cyclopentadiene and maleic anhydride with nitric acid was neutralized with an aqueous solution containing sodium hydroxide in an amount of 4 molar times or an aqueous solution containing ammonia in an amount of 4 molar times to afford a 1,2,3,4-tetrasodium salt of cyclopentanetetracarboxylic acid [I] or a 1,2,3,4-tetra-ammonium salt of cyclopentanetetracarboxylic acid [II].

A concrete test was conducted to determine the properties of the resulting cyclopentane derivatives as an additive for concrete.

Of the raw materials for the concrete, portland cement was used as the cement; river gravel with a maximum particle diameter of 2.5 mm, as the fine aggregate; and river gravel with a maximum particle diameter of 25 mm, as the coarse aggregate.

| | Run No. | Invention | | | | | Control | | |
|---|---|---|---|---|---|---|---|---|---|
| | | 1 | 2 | 3 | 4 | 5 | 1 | 2 | 3 |
| | Additive | [I] | [I] | [I] | [II] | [II] | [X] | [X] | not added |
| | Additive to cement ratio (%) | 0.125 | 0.25 | 0.5 | 0.125 | 0.25 | 0.125 | 0.25 | — |
| Raw | Cement | | | | | | | | |

-continued

| | Run No. | Invention | | | | | Control | | |
|---|---|---|---|---|---|---|---|---|---|
| | | 1 | 2 | 3 | 4 | 5 | 1 | 2 | 3 |
| Materials | Water (kg/m²) | 300 | 300 | 300 | 300 | 300 | 300 | 300 | 300 |
| | (kg/m²) | 150 | 145 | 140 | 150 | 144 | 151 | 145 | 165 |
| | Coarse Aggregate (kg/m²) | 1172 | 1181 | 1189 | 1172 | 1183 | 1171 | 1181 | 1121 |
| | Fine Aggregate (kg/m²) | 781 | 787 | 792 | 781 | 788 | 780 | 787 | 794 |
| | Water to cement rates (%) | 50 | 48.3 | 46.7 | 50 | 48 | 50.3 | 48.3 | 55 |
| | Ratio of Fine aggregate to total aggregate (%) | 40 | 40 | 40 | 40 | 40 | 40 | 40 | 41.5 |
| | Slump (cm) | 7.4 | 7.3 | 7.7 | 7.5 | 7.3 | 6.7 | 7.6 | 7.4 |
| | Amount of air (%) | 1.8 | 2.4 | 2.3 | 1.9 | 2.2 | 2.8 | 3.4 | 1.8 |
| | Compressive strength after 28 days (kg/cm²) | 417 | 445 | 447 | 411 | 456 | 404 | 427 | 380 |

NOTE:
i) [X] Additive is a commercial grade lignosulfonic acid type additive.
ii) The slump, amount of air and compressive strength were measured in accordance with the JIS Methods, A1101, A1116 and A1108, respectively.
iii) The concrete temperature was 22 – 25° C.

It is apparent from the table that performances of the concretes in which the compound [I] and compound [II] of the present invention are incorporated are much superior to that of the concrete in which the commercial grade ligninsulfonic acid type additive [X] as incorporated as well as to that of the concrete not incorporated with additive.

What is claimed is:

1. A hydraulic composition comprising 100 parts by weight of a hydraulic substance selected from portland cement, alumina cement, blast furnace slag or a mixture of quicklime and siliceous sand and 0.01–2 parts by weight of a cyclopentane derivative selected from 1,2,3,4-cyclopentanetetracarboxylic acid and alkali metal, alkaline earth metal and ammonium salts of 1,2,3,4-cyclopentanetetracarboxylic acid.

2. The composition of claim 1 wherein the hydraulic substance is portland cement.

3. The composition of claim 1 wherein the cyclopentane derivative is a salt selected from alkali metal, alkaline earth metal and ammonium salts of 1,2,3,4-cyclopentanetetracarboxylic acid.

4. A composition of claim 1 wherein the cyclopentane derivative is an alkali metal salt of cyclopentanetetracarboxylic acid.

5. The composition of claim 1 wherein the cyclopentane derivative is a sodium salt of 1,2,3,4-cyclopentanetetracarboxylic acid.

6. The composition of claim 1 wherein the cyclopentane derivative is an ammonium salt of 1,2,3,4-cyclopentanetetracarboxylic acid.

7. The composition of claim 5 wherein the cyclopentane derivative is the tetrasodium salt of 1,2,3,4-cyclopentanetetracarboxylic acid.

8. The composition of claim 6, wherein the cyclopentane derivative as the tetraammonium salt of 1,2,3,4-cyclopentanetetracarboxylic acid.

9. The composition of the claim 1 which contains 0.01–1.0 part by weight of said cyclopentane derivative, per 100 parts by weight of the hydraulic substance.

* * * * *